United States Patent [19]

Skovajsa

[11] Patent Number: 4,585,260
[45] Date of Patent: Apr. 29, 1986

[54] DEVICE FOR GRIPPING ARTICLES FOR ROBOT-TYPE MANIPULATOR

[75] Inventor: Joseph Skovajsa, Coubron, France

[73] Assignee: Societe Invo Plastic S.A.R.L., Coubron, France

[21] Appl. No.: 579,908

[22] PCT Filed: May 12, 1983

[86] PCT No.: PCT/FR83/00099

§ 371 Date: Jan. 12, 1984

§ 102(e) Date: Jan. 12, 1984

[87] PCT Pub. No.: WO83/04211

PCT Pub. Date: Dec. 8, 1983

[30] Foreign Application Priority Data

May 21, 1982 [FR] France ................................ 82 08899

[51] Int. Cl.⁴ .............................................. B25B 1/00
[52] U.S. Cl. ...................................... 294/145; 294/88; 425/436 R; 164/404; 414/744 A; 414/30
[58] Field of Search .................. 425/DIG. 51, 436 R, 425/436 RM; 164/404, 344; 414/744 A, 729, 30, 41; 294/145, 25, 90, 88

[56] References Cited

U.S. PATENT DOCUMENTS

| 1,612,495 | 12/1926 | De Long | 294/25 |
| 2,722,450 | 11/1955 | Nelson | 294/90 |
| 3,354,942 | 11/1967 | Todd et al. | 164/344 |
| 3,995,420 | 3/1974 | Preston | 294/88 |

Primary Examiner—Ronald B. Cox
Attorney, Agent, or Firm—McCormick, Paulding & Huber

[57] ABSTRACT

The device is comprised of a part (10) susceptible of being joined to the end of the manipulator arm and which is provided with a first generally flared orifice (20) intended to receive a part which has substantially a shape corresponding to that of the article to be gripped, and a second orifice (19) extending substantially perpendicularly to the first orifice (20) and opening in the latter, as well as a rod inserted in the second orifice (19) wherein the rod is free to slide, the displacement of said rod being controlled by the manipulator so as to bear against the inserted portion of the article into the first orifice (20), in order to prevent that portion from moving.

7 Claims, 5 Drawing Figures

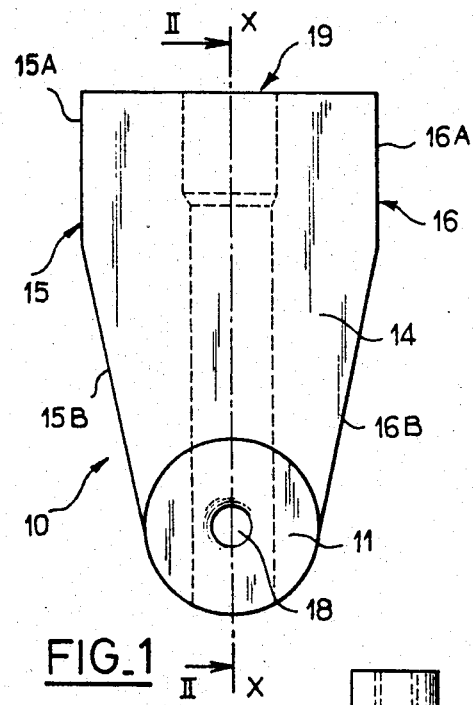
FIG_1
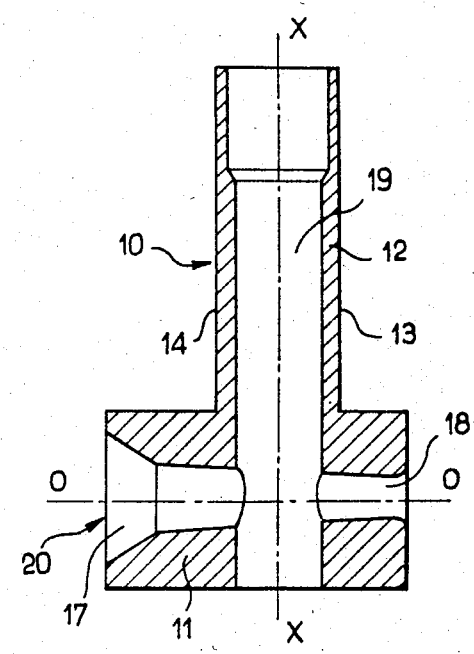
FIG_2
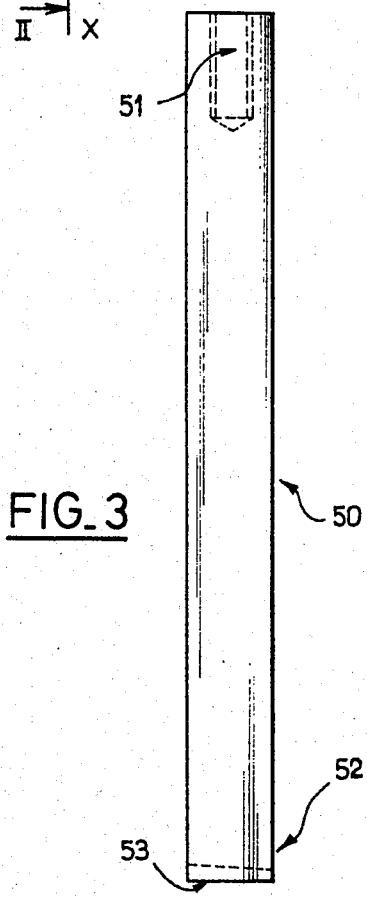
FIG_3
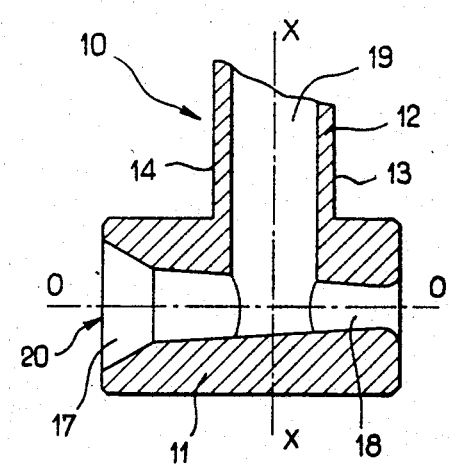
FIG_4

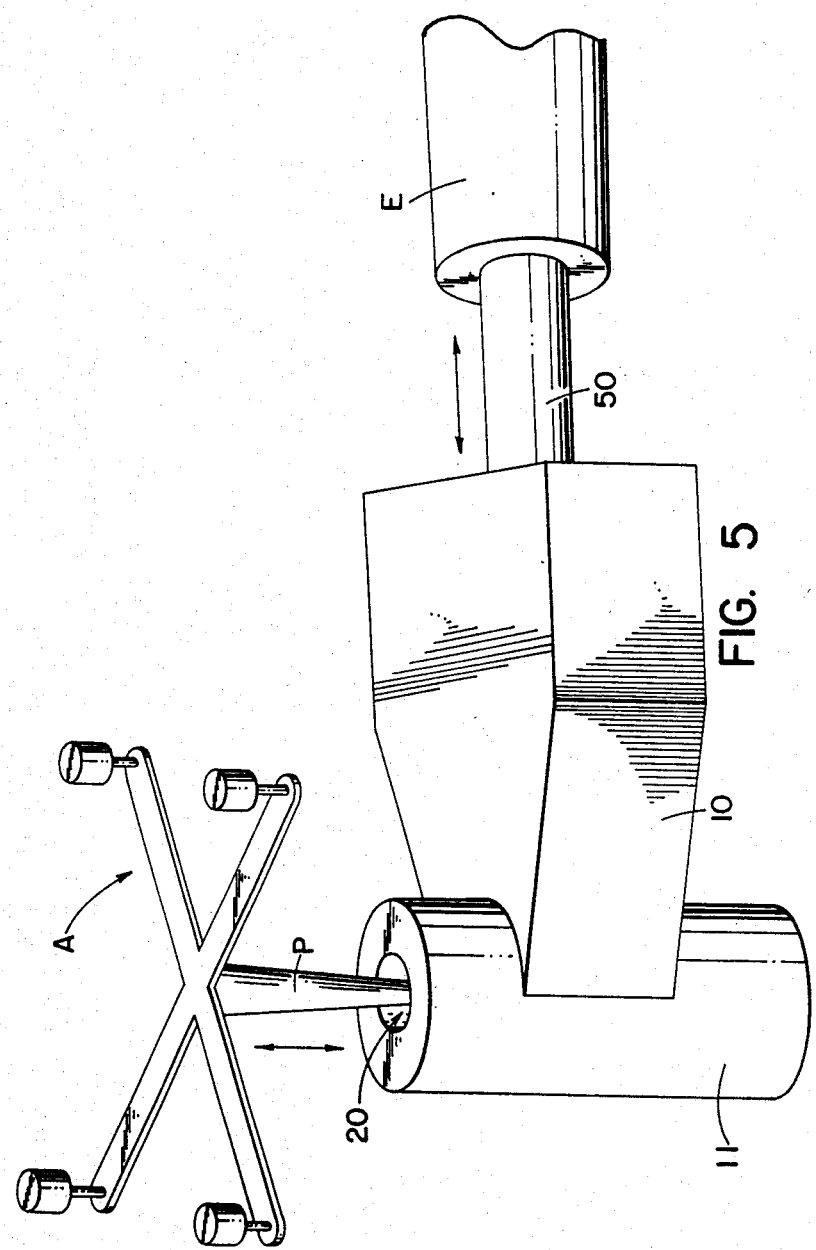

DEVICE FOR GRIPPING ARTICLES FOR ROBOT-TYPE MANIPULATOR

The present invention concerns robot-type manipulators.

More precisely, the present invention concerns a device particularly for articles of synthetic material, for a robot-type manipulator.

As is described in particular in French Patent Application No. 2,424,797, devices for gripping articles for robot-type manipulators proposed up to now are formed with gripping pliers. Such pliers generally have at least one articulated jaw and a fluid controlled actuating element. One or each articulated jaw is maintained in open or closed position by means of a spring and can be opened or closed by the actuating element.

Such arrangements permit certain gripping and holding of the article with a sensitively controlled force, whilst one may easily understand that, on the one hand, such pliers do not permit gripping of the article, at the exit from a mould, in a precise position, and on the other hand, do not permit in consequence, transference of this article to a precise position. In effect, such pliers are susceptible of gripping the article whatever the position of it.

In particular, in the case of moulding of parts in synthetic material, those which generally present themselves, at the exit from the mould, in the form of an elongated support collar, of generally truncated conical shape, at one of its ends from which is connected substantially perpendicularly a plurality of rods on which are attached, by means of thin easily breakable fingers, the said articles in question. Thus, in the case where the said parts must be lifted together in the mould with precision, and possibly displaced therein for removal from the mould, and then brought into a precise predetermined position, the existing pliers cannot give satisfaction. In fact, these are apt to grip the said truncated conical collar, at any position, and according to whatever inclination, and further, once gripped, the parts are susceptible of pivoting between the two jaws, with the result that it is quite impossible to know with precision the position of the part with respect to the pincers.

This problem is posed in particular, when the said parts in moulded synthetic material have screwed portions; one may easily understand that in such a case, it will be necessary to obtain a particularly precise position of these parts.

The need is therefore felt to arrange article gripping members, in particular, articles in synthetic moulded material, for robot-type manipulators, which are at the same time of simple, robust and economic form, and which produce a precise positioning of articles. On the other hand it will be advantageous that the said gripping members are adaptable to the previously existing robot-type manipulators.

The present invention eases the situation on this point by proposing a device for gripping articles for robot-type manipulators consisting of a part susceptible of being joined to the end of an arm of the manipulator, and which is provided with a first, generally flared orifice, intended to receive a part with a substantially corresponding shape of the article to be gripped, and with a second orifice extending substantially perpendicular to the first orifice, and opening into the latter, as well as a rod inserted in the second orifice in which it is free to slide, displacement of the said rod being controlled by the manipulator so as to bear against the portion of the article inserted into the orifice and to prevent it from moving.

The gripping device according to the invention, on the one hand permits easy gripping of the part in the mould, and this with precision, and on the other hand maintains this fixedly in a constant relative position, with the result that the part can be ultimately transferred into whatever precise predetermined position is chosen.

According to an advantageous embodiment of the present invention, the first orifice consists of a first truncated conical section strongly flaring, open towards the outside of the part, at the side of which the portion of the article is introduced, and a second truncated conical section coaxial with the first section, with less strong flaring, open towards the first section.

According to one characteristic of the present invention, the first orifice is transverse.

According to another characteristic of the present invention, the second orifice is cylindrical. According to a particular characteristic of the present invention, the second orifice is blind.

According to an advantageous embodiment of the present invention, the end of the rod directed towards the first orifice is provided with a transverse semi-truncated conical bore of the same conicity as the second section of the second orifice.

Other characteristics and advantages of the present invention will appear on reading of the detailed description which follows with reference to the accompanying drawings, which should be considered as incorporated in the description by this reference, and in which:

FIG. 1 shows a side view of the said piece of the gripping device according to the present invention, FIG. 2 shows a cross-sectional view of the same piece, on the line II—II in FIG. 1, FIG. 3 shows a side view of the rod of the gripping device of the present invention, FIG. 4 shows a partial view similar to FIG. 2, of a variant.

FIG. 5 shows a general view of a gripping device according to the present invention.

As shown in FIGS. 1 and 3, the device for gripping articles for robot-type manipulators, according to the present invention, is comprised of a part 19 (shown in FIG. 1) and of a rod 50 (shown in FIG. 3), which are intended to cooperate.

More precisely, as shown in FIGS. 2 and 3, the said piece 10 consists of a cylindrical portion 11 with an axis O—O, on which is perpendicularly connected a portion 12. The shape of the latter is determined on the one hand by two parallel walls 13, 14 perpendicular to the axis O—O of the first cylindrical portion 11 and, on the other hand, by two walls 15, 16 perpendicular to the said walls 13, 14. Each of these walls 15, 16 consists of a first section 15A, 16A longer than the first cylindrical portion 11 (the said first sections of the walls 15, 16 being parallel, further apart than the diameter of the cylindrical portion 11, and symmetrical with respect to the first cylindrical portion 11), which are each extended by a section 15B, 16B which approach the cylindrical surface of the portion 11 tangentially.

As shown in FIG. 2, the first cylindrical portion 11 has a through orifice 20 with an axis coincident with the said axis O—O. More precisely, the orifice in question consists of a first truncated conical section 17, strongly flared, open towards the outside of the part 10 at the edge through which a part of an article to be gripped is intended to be introduced, and of a second section 18, also truncated conical, coaxial with the first section, but of less strong flaring, open towards the first section 17. One may easily understand, that the strong flaring of the first section has the object of facilitating the insertion of the said part of the article into the interior of the orifice 20.

On the other hand, as also shown in FIG. 2, the part 10, and more precisely the second portion 12 is provided with a second orifice 19, with an axis X—X substantially perpendicular to the axis O—O of the previously mentioned orifice. In the embodiment shown in FIG. 2, the second orifice 19 like the first extends through. Whilst as shown in FIG. 4, one may envisage that the said second orifice 19 does not pass through the entire piece, the essential being always that the second orifice 19 opens into the first orifice 20 coaxial with the first cylindrical portion 11. As shown in FIG. 2, the second orifice 19 is cylindrical. More precisely in the embodiment shown in FIG. 2, the second orifice 19 consists of two coaxial cylindrical sections, having different diameters, the section having the larger diameter being opposite from the cylindrical portion 11, for facilitating insertion of a rod 50, as shown in FIG. 3, into the interior of the said second orifice 19.

As shown in FIG. 3, the rod 50, of generally cylindrical shape, has a diameter slightly smaller than the internal diameter of the smaller diameter section of the second orifice 19, in order that this rod 50 may be introduced into the second orifice 19, sliding freely. At one of its ends, the rod 50 is preferably provided with a blind internally threaded bore 51 coaxial with the axis of the rod 50, for permitting fixing of the said end of the rod 50, onto a known actuating element E of the robot manipulator, in such manner that the rod 50 may be displaceably controlled in translation, by the manipulator, and more precisely by the said actuating element, at the interior of the second orifice 19 of the part P, for bearing against the part P of the article A to be gripped, introduced into the first orifice 20, and thus preventing the article from moving. To this end, the said part 10 must also be provided with means (not shown) susceptible of being joined to the end of an arm of the manipulator. Such means may be constituted by, for example, transverse threaded bores, arranged in the second portion 12, from one part to another of the second orifice 19 and this, substantially parallel to the axis O—O of the first cylindrical portion.

It should be noted that the means permitting joining on the one hand of the part 10 onto the manipulator, and on the other hand, the rod 50 onto an actuating element thereof can take numerous forms.

According to an advantageous embodiment, such as shown in FIG. 3, the end 52 of the rod 50, introduced into the second orifice 19 of the part 10, and consequently directed towards the first orifice 20 is preferably provided with a transverse bore 53, semi-truncated conical, of the same conicity as the second section of the second orifice. One may readily understand that such an arrangement has the object of increasing the contact surface between the end of the rod 50 and the portion of the article introduced into the first orifice 20 of the part 10, in a manner to directly prevent this portion from moving and consequently to facilitate manipulations of the article.

It should be noted that the present invention is not limited by the embodiments described from which one may envisage numerous variants within the spirit of the invention, notably the particular form of the first orifice 20 will be easily adapted if necessary to the shape of the object to be gripped.

I claim:

1. In a robot-type manipulator, a device for gripping moulded synthetic articles having a part of tapered shape, which comprises:
   a rigid piece having connecting means for joining said piece to the end of an arm of the manipulator,
   and provided with a first, generally flared orifice with a substantially corresponding shape than said tapered part of the articles so as to receive said part, and a second orifice extending substantially perpendicular to the first orifice and opening into said first orifice,
   a rod inserted in the second orifice and sliding freely in said second orifice, and
   an actuating element joined to the rod so as to control displacement of said rod in the second orifice and urging said rod towards the first orifice, when a tapered part of an article is inserted in said orifice so that the rod bears against said tapered part and prevents it from moving.

2. Device according to claim 1, characterized by the fact that the first orifice consists of a first truncated conical section strongly flaring, open towards the outside of the piece at the side of which said tapered part of the article is introduced, and a second truncated conical section coaxial with the first section, with less strong flaring, open towards the first section.

3. Device according to claim 1, characterized by the fact that the first orifice pass through the piece from one side to the other.

4. A device according to claim 1, characterised by the fact that the second orifice is cylindrical.

5. A device according to claim 1, characterised by the fact that the second orifice is blind.

6. Device according to claim 2, characterized by the fact that the end of the rod directed towards the first orifice is provided with a transverse semi-truncated conical bore of the same conicity as that of the second section of the first orifice.

7. A device according to claim 6, characterised by the fact that the other end of the rod is provided with a blind threaded bore, coaxial with the axis of the rod, in a manner to assure fixing of the rod on said actuating element of the manipulator.

* * * * *

UNITED STATES PATENT AND TRADEMARK OFFICE
CERTIFICATE OF CORRECTION

PATENT NO. : 4,585,260
DATED : April 29, 1986
INVENTOR(S) : Joseph Skovajsa

It is certified that error appears in the above—identified patent and that said Letters Patent are hereby corrected as shown below:

Title page, Item [22] reading "May 12, 1983" should read --May 19, 1983--.

Signed and Sealed this

Seventeenth Day of February, 1987

Attest:

DONALD J. QUIGG

Attesting Officer     Commissioner of Patents and Trademarks